(12) United States Patent
Palmer et al.

(10) Patent No.: US 11,015,435 B2
(45) Date of Patent: May 25, 2021

(54) DISTRIBUTED SENSOR ARRAYS FOR MEASURING ONE OR MORE OF PRESSURE AND TEMPERATURE AND RELATED METHODS AND ASSEMBLIES

(71) Applicant: Quartzdyne, Inc., Salt Lake City, UT (US)

(72) Inventors: Matthew Palmer, Sandy, UT (US); Tyler Sorensen, Bluffdale, UT (US); G. Scott Brown, Eagle Mountain, UT (US); K. Robert Harker, Herriman, UT (US); Trent Heath, Kaysville, UT (US)

(73) Assignee: Quartzdyne, Inc., Salt Lake City, UT (US)

( * ) Notice: Subject to any disclaimer, the term of this patent is extended or adjusted under 35 U.S.C. 154(b) by 214 days.

(21) Appl. No.: 16/221,843

(22) Filed: Dec. 17, 2018

(65) Prior Publication Data

US 2019/0186256 A1    Jun. 20, 2019

Related U.S. Application Data

(60) Provisional application No. 62/607,231, filed on Dec. 18, 2017.

(51) Int. Cl.
*E21B 47/07* (2012.01)
*G01K 7/32* (2006.01)
(Continued)

(52) U.S. Cl.
CPC ............ *E21B 47/07* (2020.05); *E21B 47/017* (2020.05); *E21B 47/06* (2013.01); *E21B 47/135* (2020.05);
(Continued)

(58) Field of Classification Search
CPC ........ E21B 47/07; E21B 47/017; E21B 47/26; E21B 47/135; E21B 47/06; G01K 1/08; G01K 1/026; G01K 7/32
See application file for complete search history.

(56) References Cited

U.S. PATENT DOCUMENTS

| 3,561,832 A | 2/1971 | Karrer |
| 3,594,701 A | 7/1971 | Ramsey et al. |

(Continued)

FOREIGN PATENT DOCUMENTS

| CA | 2492608 | 1/2004 |
| CA | 2467313 | 11/2004 |

(Continued)

OTHER PUBLICATIONS

FR Patent Application No. 1873089, Search Report and Written Opinion dated Mar. 16, 2020, 14 pp.

(Continued)

*Primary Examiner* — David Z Huang
(74) *Attorney, Agent, or Firm* — Phillips Winchester (57) ABSTRACT

A downhole sensor includes a sensor housing with one or more of a pressure sensor or a temperature sensor. A cable segment having a conductor is coupled to the sensor housing. A spacer or retention element is coupled to or secured to at least a portion of the conductor at a location proximate an interface between the cable segment and the sensor housing. Downhole sensor arrays include such sensor housings. Methods relate to forming such sensor arrays.

20 Claims, 3 Drawing Sheets

(51) Int. Cl.
*E21B 47/06* (2012.01)
*G01K 1/08* (2021.01)
*G01K 1/02* (2021.01)
*E21B 47/017* (2012.01)
*E21B 47/26* (2012.01)
*E21B 47/135* (2012.01)

(52) U.S. Cl.
CPC ............ *E21B 47/26* (2020.05); *G01K 1/026* (2013.01); *G01K 1/08* (2013.01); *G01K 7/32* (2013.01)

(56) References Cited

U.S. PATENT DOCUMENTS

| | | | |
|---|---|---|---|
| 3,617,780 | A | 11/1971 | Benjaminson et al. |
| 4,550,610 | A | 11/1985 | EerNisse |
| 4,627,490 | A | 12/1986 | Moore |
| 4,629,888 | A | 12/1986 | Wolk |
| 4,754,646 | A | 7/1988 | EerNisse et al. |
| 4,901,804 | A * | 2/1990 | Thometz ............... E21B 47/00 175/40 |
| 5,231,880 | A | 8/1993 | Ward et al. |
| 5,303,773 | A | 4/1994 | Czernichow et al. |
| 5,471,882 | A | 12/1995 | Wiggins |
| 6,009,216 | A | 12/1999 | Pruett et al. |
| 6,131,462 | A | 10/2000 | EerNisse et al. |
| 6,886,638 | B2 | 5/2005 | Ahmed et al. |
| 6,888,972 | B2 | 5/2005 | Berg et al. |
| 6,919,512 | B2 | 7/2005 | Guven et al. |
| 6,966,228 | B2 | 11/2005 | Binet et al. |
| 7,216,719 | B2 | 5/2007 | Ahmed et al. |
| 7,340,819 | B2 | 3/2008 | Guven et al. |
| 7,712,524 | B2 | 5/2010 | Patel et al. |
| 7,735,555 | B2 | 6/2010 | Patel et al. |
| 7,775,275 | B2 | 8/2010 | Patel |
| 7,793,718 | B2 | 9/2010 | Patel et al. |
| 7,817,062 | B1 | 10/2010 | Li et al. |
| 7,836,959 | B2 | 11/2010 | Howard et al. |
| 7,890,273 | B2 | 2/2011 | Lovell et al. |
| 7,896,070 | B2 | 3/2011 | Lovell |
| 7,913,773 | B2 | 3/2011 | Li et al. |
| 8,028,571 | B2 | 10/2011 | Besson |
| 8,056,619 | B2 | 11/2011 | Patel et al. |
| 8,082,983 | B2 | 12/2011 | Patel et al. |
| 8,082,990 | B2 | 12/2011 | Lovell et al. |
| 8,146,658 | B2 | 4/2012 | Howard et al. |
| 8,195,398 | B2 | 6/2012 | Lovell et al. |
| 8,235,127 | B2 | 8/2012 | Patel et al. |
| 8,312,923 | B2 | 11/2012 | Patel et al. |
| 8,333,117 | B2 | 12/2012 | Brown et al. |
| 8,548,743 | B2 | 10/2013 | Lovell |
| 8,671,749 | B2 | 3/2014 | Zeineddine |
| 8,757,276 | B2 | 6/2014 | Alff et al. |
| 9,540,917 | B2 | 1/2017 | Stone et al. |
| 10,132,156 | B2 | 11/2018 | Leeflang |
| 2005/0279442 | A1 | 12/2005 | Guven et al. |
| 2007/0030167 | A1 | 2/2007 | Li et al. |
| 2007/0227727 | A1 | 10/2007 | Patel et al. |
| 2007/0289779 | A1 | 12/2007 | Howard et al. |
| 2009/0151935 | A1 | 6/2009 | Lovell et al. |
| 2009/0173493 | A1 | 7/2009 | Hutin et al. |
| 2010/0116550 | A1 | 5/2010 | Hutin et al. |
| 2010/0200291 | A1 | 8/2010 | Patel et al. |
| 2010/0319931 | A1 | 12/2010 | Alff et al. |
| 2011/0107834 | A1 | 5/2011 | Howard et al. |
| 2011/0191031 | A1 | 8/2011 | Harman et al. |
| 2011/0229071 | A1 | 9/2011 | Vincelette et al. |
| 2012/0013482 | A1 | 1/2012 | Patel et al. |
| 2012/0198939 | A1 | 8/2012 | Brown et al. |
| 2012/0306581 | A1 | 12/2012 | Godager |
| 2012/0323494 | A1 | 12/2012 | Lovell et al. |
| 2013/0220029 | A1 | 8/2013 | Gardner et al. |
| 2014/0069719 | A1 * | 3/2014 | Coles ................... H01R 13/41 174/74 R |
| 2014/0174714 | A1 | 6/2014 | Patel et al. |
| 2014/0278155 | A1 | 9/2014 | EerNisse et al. |
| 2015/0007650 | A1 | 1/2015 | Rose et al. |
| 2015/0059483 | A1 | 3/2015 | Puccio et al. |
| 2016/0123135 | A1 * | 5/2016 | Leeflang ............... B23K 31/02 73/152.12 |
| 2019/0309616 | A1 | 10/2019 | Leeflang |

FOREIGN PATENT DOCUMENTS

| | | |
|---|---|---|
| CA | 2591619 | 11/2004 |
| CA | 2724709 | 11/2004 |
| EP | 1915504 | 4/2008 |
| GB | 2382474 | 5/2003 |
| GB | 2402559 | 12/2004 |
| GB | 2412340 | 9/2005 |
| WO | WO2008060769 | 5/2008 |
| WO | WO2010025025 | 3/2010 |
| WO | WO2011006083 | 1/2011 |

OTHER PUBLICATIONS

ICTA. International Coiled Tubing Association presents An Introduction to Coiled Tubing History, Applications and Benefits, www.icota.com, (2005), 32 pp.

Brown et al., U.S. Provisional Patent Application to Brown et al., filed on Nov. 3, 2014., U.S. Appl. No. 62/074,517, 27 pp.

\* cited by examiner

DISTRIBUTED SENSOR ARRAYS FOR MEASURING ONE OR MORE OF PRESSURE AND TEMPERATURE AND RELATED METHODS AND ASSEMBLIES

CROSS-REFERENCE TO RELATED APPLICATION

This application claims the benefit under 35 U.S.C. § 119(e) of U.S. Provisional Patent Application Ser. No. 62/607,231, filed Dec. 18, 2017, the disclosure of which is hereby incorporated herein in its entirety by this reference.

TECHNICAL FIELD

Embodiments of the present disclosure relate to sensors for measurement of at least one of a pressure and temperature in a subterranean wellbore and, more particularly, to distributed arrays of such sensors, related assemblies, and associated methods.

BACKGROUND

In some applications, e.g., oil and gas production, it may be desirable to collect data from along a particular interval (e.g., length, depth) of a wellbore to obtain information regarding pressure and/or temperature gradients within the wellbore by employing a number of sensors spaced along the interval to measure pressure and/or temperature sensors distributed in an array extending substantially along the wellbore interval. When implemented in a downhole environment, the sensors and/or housings may be exposed to pressures up to about 30,000 psi (about 206.84 MPa) and temperatures of up to 200° C. Accordingly, housings of such sensors must be sufficiently robust to withstand such pressures and temperatures when in use.

In many conventional temperature sensor arrays, optical fibers are used as temperature sensors of the sensor array. In such a temperature sensing approach, optical fibers are implemented as linear sensors where temperature affects the light transmissivity through the optical fibers to create a continuous temperature profile of the downhole environment. However, optical fibers may fail to correctly transmit data if the fibers are bent (e.g., kinked) to a radius of curvature smaller than a certain fixed value, such value depending upon the fiber characteristics. Furthermore, optical fibers may be relatively fragile and prone to failure under conditions where the fibers are subject to shock and vibration. Moreover, as the housings of such sensor arrays must withstand the extreme downhole conditions described above, particularly extreme pressures for prolonged time periods, methods of bonding individual constituent components of the sensor array must provide a sufficiently robust connection between the components to isolate and protect the fragile optical fibers. However, implementation of conventional component bonding methods such as welding, which may provide a robust connection between components, may expose sensitive components of the sensor array to excessive, and potentially damaging, heat required by the welding process.

BRIEF SUMMARY

In some embodiments, a downhole distributed sensor array includes sensor housings, each sensor housing containing one or more of a pressure sensor and a temperature sensor. Cable segments connect the sensor housings, where at least one of the cable segments comprising a conductor extending through the at least one cable segment. A spacer is positioned adjacent and coupled to at least a portion of the conductor at a location proximate an interface between the at least one cable segment and a respective sensor housing of the sensor housings coupled to the at least one cable segment. The spacer is configured to at least partially secure the conductor in a direction along a length of the conductor.

In additional embodiments, a downhole distributed sensor array includes sensor housings containing one or more of a pressure sensor and a temperature sensor, cable segments, each cable segment connected to at least one sensor housing and comprising an insulation material disposed between a central conductor and an outer jacket, a weld joint peripherally bonding a longitudinal end portion of the at least one sensor housing to the outer jacket of a cable segment of the cable segments, and a retention element positioned outside and proximate to the cable segment. A portion of the central conductor of the cable segment is secured to the retention element.

In yet additional embodiments, a downhole sensor includes a sensor housing containing at least one of a pressure sensor or a temperature sensor, at least one cable segment coupled to the sensor housing the at least one cable segment having a conductor extending through the at least one cable segment, and a retention element positioned about and coupled to at least a portion of the conductor at a location proximate an interface between the at least one cable segment and the sensor housing. The retention element is configured to at least partially secure the conductor in a direction along a length of the conductor.

In yet additional embodiments, the present disclosure includes a method of forming a sensor for downhole use. The method includes removing a portion of an insulation material from between a conductor of a cable segment and a jacket of the cable segment proximate an end portion of the cable segment to create an annular opening between the conductor and a surrounding portion of the jacket; disposing at least one insulative material within the annular opening; securing a spacer to the conductor proximate the end portion of the cable segment; and inserting the end portion of the cable segment with the spacer secured to the conductor into a sensor housing.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure provided with reference to the accompanying drawings, in which:

DETAILED DESCRIPTION

In the following detailed description, reference is made to the accompanying drawings that depict, by way of illustration, specific embodiments in which the disclosure may be practiced. However, other embodiments may be utilized, and structural, logical, and configurational changes may be made without departing from the scope of the disclosure. The illustrations presented herein are not meant to be actual views of any particular sensor, sensor array, or component thereof, but are merely idealized representations that are employed to describe embodiments of the present disclosure. The drawings presented herein are not necessarily drawn to scale. Additionally, elements common between drawings may retain the same numerical designation.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met.

As used herein, the term "conductor" may mean and include an electrically conductive structure such as, for example, a wire or trace.

Figure 1:
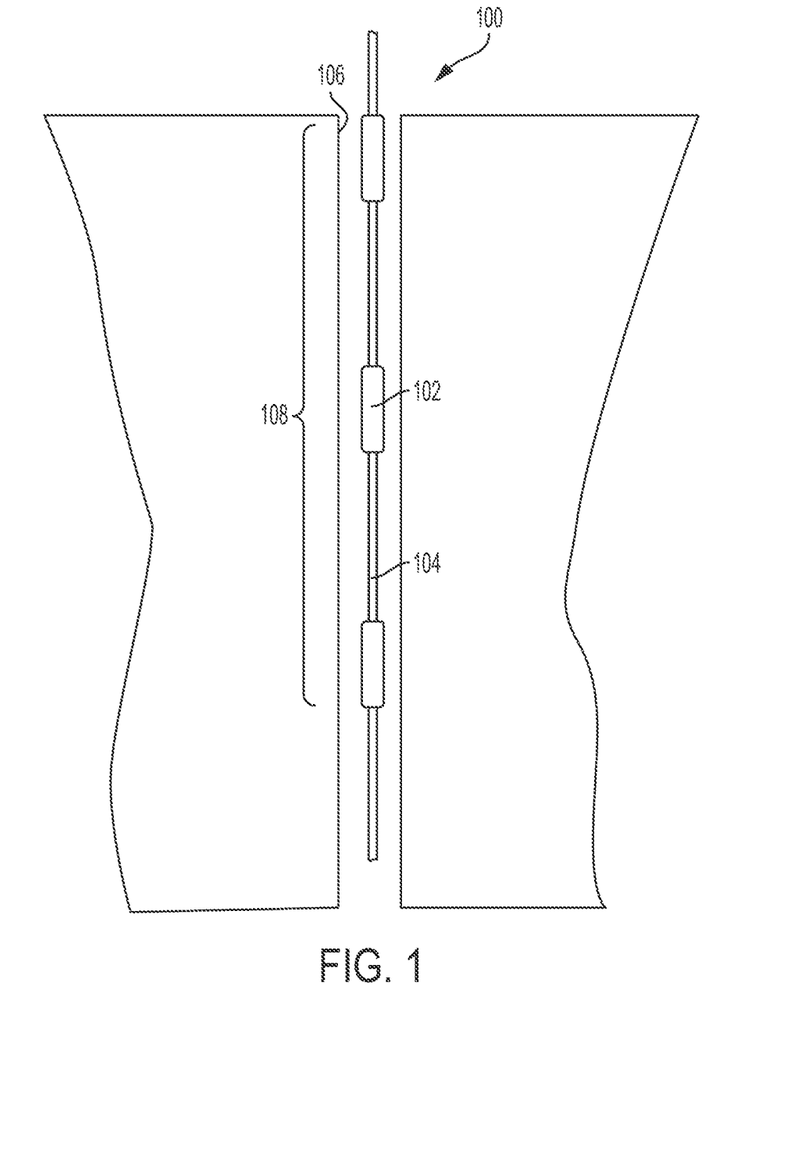
FIG. 1 is an elevation view of a sensor array in accordance with an embodiment of the present disclosure deployed in a wellbore.

Referring now to FIG. 1, a sensor array 100 according to the disclosure includes sensors 102 interconnected by lengths of cable 104. The sensor array 100 may include any suitable number of sensors 102. For example, in some embodiments of the disclosure, the sensor array 100 may include between ten and one hundred sensors 102. The sensors 102 may each be configured to detect at least one of a pressure or a temperature. For example, some or all of the sensors 102 in the sensor array 102 (e.g., a distributed sensor array) may each be configured to at least substantially simultaneously (e.g., at substantially the same time, in the same time interval) detect at least one of a pressure and a temperature in a wellbore and relay those sensed values such that a continuous profile of conditions in the wellbore relating to such sensed values may be provided to an operator monitoring wellbore conditions.

The sensor array 100 may be deployed within a wellbore 106, e.g., a well for the production of oil and/or natural gas. Each sensor 102 of the sensor array 100 may be used to collect data related to at least one of a pressure and a temperature at a particular location within the wellbore 106. For example, the each sensor 102 of the sensor array 100 may collect data relating to conditions within a string of tubular components (e.g., a production string) positioned in the wellbore 106, data relating to conditions in an annulus between the string in the wellbore 106 and the wellbore 106 itself, or combinations thereof. For example, the sensor array 100 may be positioned outside of the production string in the wellbore annulus between the string and a casing or liner string adjacent the wall of the wellbore. In some embodiments, the sensor array 100 may be placed in direct communication with an interior of the production string in the wellbore. For example, the sensor array 100 may be coupled to the outside of the production string and one or more apertures in the production string may place the sensor array 100 in communication with the interior of the production string (e.g., in direct communication with pressure and/or temperature inside the production string via the apertures). Data from each individual sensor 102 may be combined to provide information about a pressure and/or temperature profile within the wellbore 106 along a length 108 of the wellbore 106 along which the sensor array 100 is deployed.

In some embodiments, a downhole end of the sensor array may include a stopper or plug in one of the sensors 102 or the cable 104.

Figure 2:
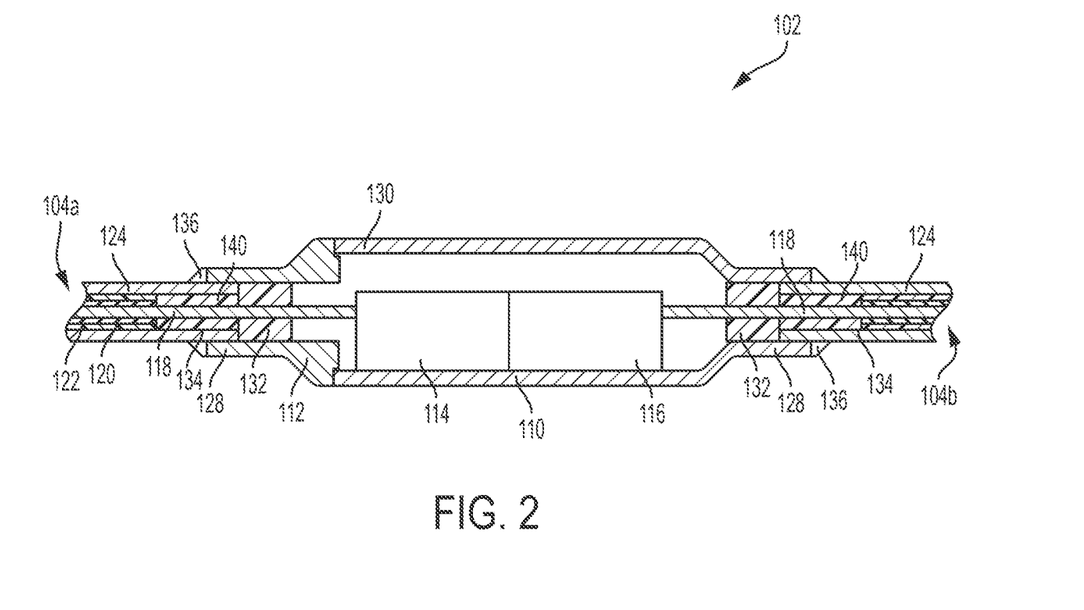
FIG. 2 is a cross-sectional view of a sensor of the sensor array of FIG. 1.

Referring now to FIG. 2, a sensor 102 of the sensor array 100 (FIG. 1) may include one or more sensing elements 114 and one or more electronic components 116 configured to distribute power to, receive data from, and otherwise control the function of the one or more sensing elements 114. The one or more sensing elements 114 and the electronic components 116 may be operatively connected to central electrical conductors 118 within a first cable segment 104a and a second cable segment 104b.

In some embodiments, the one or more sensing elements 114 may include, e.g., one or more resonator sensors, such as, for example, resonator sensors implementing one or more thickness shear mode quartz crystal resonators. As a non-limiting example, suitable quartz resonator sensors may include sensors similar or identical to those described in U.S. patent application Ser. No. 14/472,218, filed Aug. 8, 2014, the disclosure of which is herein incorporated in its entirety by this reference, which application describes the use of quartz crystal sensing elements to sense at least one of a pressure and a temperature. In additional embodiments, the one or more sensing elements 114 may include microelectro-mechanical devices (MEM devices) or other types of suitable electronic sensors.

The conductor 118 of the cable segments 104a, 104b may be surrounded by insulation 120 (e.g., electrical and/or thermal insulation), an encapsulation material 122, and a jacket 124. The jacket 124 may be formed of a relatively high-strength material (e.g., metal) as compared to the insulation 120 and encapsulation layer 122. The insulation 120 may comprise a high-dielectric polymer material, examples of which may include polytetrafluoroethylene (PTFE) or fluorinated ethylene propylene (FEP). The encapsulation layer 122 may comprise another polymer material, such as polypropylene. The metal jacket 124 may comprise a metal alloy. For example, the metal jacket 124 may comprise 316L stainless steel.

In some embodiments, the conductor 118 may be a single conductor within and extending through the cable segments 104a, 104b. The conductor 118 may serve to transmit power to drive the one or more sensing elements 114 from a power source located on a rig floor of a drilling rig at the surface of the wellbore 106 (FIG. 1) and may also serve to transmit data signals from the one or more sensing elements 114 in each sensor 102 to monitoring equipment located on the rig floor at the surface of the wellbore 106, or remotely. For example, the sensing elements 114 may be connected through the conductors 118 of the cable segments 104a, 104b, by a multiplexing arrangement controlled by the monitoring equipment (not shown) at the surface of the wellbore 106 and/or by the electronic components 116. In other embodiments, the cable segments 104a, 104b may include multiple conductors 118.

In some embodiments, the one or more electronic components 116 may further be configured to include a bypass mode triggered in the event that a portion of the sensor 102 may be become damaged or malfunction. For example, an associated one or more sensing elements 114 of the sensor 102 may malfunction or become damaged. The one or more electronic components 116 may be configured to recognize failure of the one or more sensing elements 114 or other portion of the sensor 102 and enter the bypass mode so that the sensor 102 does not inhibit or corrupt data flow from and between remaining functional sensors to the surface of the drilling operation.

The one or more sensing elements 114 and the one or more electronic components 116 may be disposed within a housing including one or more housing portions. For example, a housing of the sensor 102 may include multiple portions to enable installation of the sensing elements 114 and the electronic components 116 within the housing. For example, the housing of the sensor 102 may include a housing body 110 and a separate housing end cap 112. The housing body 110 may include one or more features configured to accept a portion of the second cable segment 104b. For example, a sleeve 128 may have an inside diameter substantially similar (e.g., equal to, slightly larger or smaller than) to an outside diameter of the metal jacket 124 of the cable segments 104a, 104b and smaller than an inside diameter of the housing body 110 in order to receive a portion of the metal jacket 124 of the cable segment 104b in the sleeve 128. The housing body 110 may also include a second, open end 130 configured to interface with a portion of the housing end cap 112. The housing end cap 112 may also include a sleeve 128 having an inside diameter substantially similar to the outside diameter of the metal jacket 124 of the cable segment 104a in order to receive a portion of the metal jacket 124 of the cable segment 104a in the housing end cap 112.

While the embodiment of FIG. 2 includes one end cap 112, other embodiments may include end caps 112 on each end of the housing body 110.

The conductors 118 of the cable segments 104a, 104b may be supported and centralized within the housing body 110 by support spacers 132 or anchors disposed within the sleeves 128 of the main housing body 110 and the housing end cap 112 proximate end portions of the cable segments 104a, 104b. The support spacers 132 may comprise an electrically insulating material, such as a polymer or elastomer material (e.g., polypropylene, polytetrafluoroethylene (PTFE), polyethylene terephthalate (PET), polyether ether ketone (PEEK), etc.). The support spacers 132 may abut an end of the metal jacket 124 of the cable segments 104a, 104b, and may be of an outer diameter substantially the same as an inner diameter of sleeves 128, or slightly larger than the inner diameter when in an uncompressed state.

As discussed below in greater detail, in some embodiments, the support spacers 132 may act as a retention element or feature to secure the conductor 118 (e.g., along a major dimension, such as a length, of the conductor 118), for example, by being secured to a portion of the conductor 118.

At least a portion of the cable segments 104a, 104b may at least partially lack one or both of the insulation 120 and encapsulation material 122. For example, one or both of the insulation 120 and encapsulation material 122 may be removed from between the metal jacket 124 and the conductor 118 proximate ends of the cable segments 104a, 104b disposed within sleeves 128 of the housing body 110 and housing end cap 112 to define an end region 134 proximate an end portion of the cable segments 104a, 104b (e.g., proximate the support spacers 132).

In some embodiments, one or more structures (e.g., one or more inner sleeves 140, for example, a thermally and/or electrically isolative sleeve and/or a securing sleeve) may be disposed at the end region 134 (e.g., where the insulation 120 and encapsulation material 122 have been removed). For example, inner sleeve 140 may be disposed between one or more of the insulation 120 or the encapsulation material 122 (e.g., the end portions of the insulation 120 or the encapsulation material 122) the support spacers 132. In some embodiments, the inner sleeve 140 may act to insulate the conductor 118 (e.g., from heat energy, for example, during a welding operation). In some embodiments, the inner sleeve 140 may act to secure the conductor 118. For example, the inner sleeve 140 may be coupled with (e.g., clamped or crimped around) the conductor 118 in order to secure and at least partially prevent the conductor 118 from moving (e.g., in a direction along the length or longitudinal axis of the conductor 118). In some embodiments, the inner sleeve 140 may comprise fingers that may be clamped around the conductor 118 in order to secure the conductor 118.

In some embodiments, the inner sleeve 140 may extend substantially from the end portions of the insulation 120 or the encapsulation material 122 to the support spacers 132. The sleeve 140 may be disposed at least partially around the conductor 118. For example, the sleeve 140 may comprise an at least partially annular structure and extend about or around a portion (e.g., a majority, an entirety) of the conductor 118.

In some embodiments, in a lateral direction of the housing body 110 (e.g., in a direction extending transverse to the length of the conductor 118), the inner sleeve 140 may extend at least partially (e.g., substantially entirely) between the conductor 118 and the metal jacket 124 near (e.g., proximate, at) the sleeves 128 of the housing body 110 and housing end cap 112 when the cable segments 104a, 104b are disposed within the housing body 110 and housing end cap 112. The conductors 118 of the cable segments 104a, 104b may be exposed proximate a union between the cable segments 104a, 104b and the end cap 112 and housing body 110, respectively.

The sensors 102 and cable segments 104a, 104b are joined to form the sensor array 100 (FIG. 1). For example, the sensors 102 may be connected to the cable segments 104a, 104b by bonding (e.g., welding) the sleeves 128 of the housing body 110 and the housing end cap 112 to the metal jacket 124 of the cable segments 104a, 104b. For example, the sleeves 128 and the metal jacket 124 may be welded together at a circumferentially extending joint (e.g., weld bead or weld 136), which may also characterized herein as a "weld joint." The weld 136 may be located on the jacket 124 proximate the portion of the cable segments 104a, 104b from which the insulation 120 and encapsulation material 122 have been removed.

Figure 3:
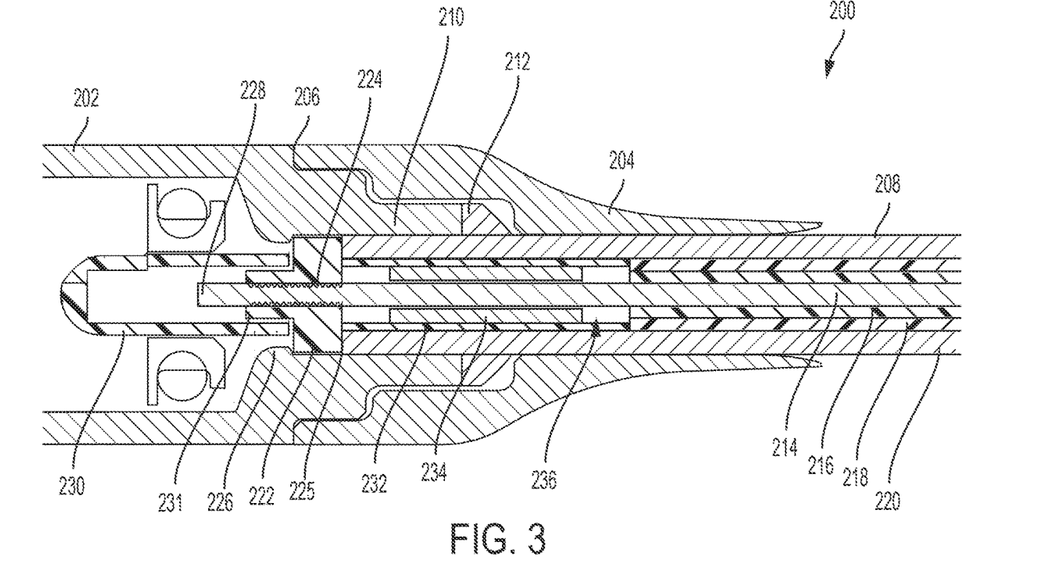
FIG. 3 is a cross-sectional elevation view of a portion of a sensor in accordance with an embodiment of the present disclosure.

FIG. 3 is a cross-sectional elevation view of a portion of a sensor 200 (e.g., a temperature and/or pressure sensor) for use in a sensor array 100 (FIG. 1). In some embodiments, the sensor 200 may be similar to and include similar components of the sensor 102 discussed above in relation to FIGS. 1 and 2. As shown in FIG. 3, one side of the sensor 200 includes a housing body 202, a housing end cap 204, and a cable segment 206. While FIG. 3 depicts one side of the sensor 200, the other, opposing side may comprise as similar configuration. For example, the opposing side may include a similar end cap and portion of the housing body 202. In some embodiments, the opposing side may include a similar end cap and portion of the housing body 202, which may differ in size and configuration to enable installation of components of the sensor 200 similar to that shown and described above with reference to FIG. 2.

The housing body 202 and the housing end cap 204 may be bonded to one another circumferentially at a joint 206. For example, the housing body 202 and the housing end cap 204 may be bonded together at joint 206 by a welding process, e.g., an electron-beam welding process. An electron-beam welding process may enable the housing body 202 and the housing end cap 204 to be welded to one another without substantially exposing the internal components of the sensor 200 and cable segment 208 to excessive heat. Other suitable welding processes may include gas tungsten arc welding (i.e., TIG welding), gas metal arc welding, (i.e., MIG welding), flux-shielded arc welding, oxygen-acetylene torch welding, laser beam welding, etc.

The housing body 202 and the housing end cap 204 each include an opening into which the cable segment 208 may be inserted. The cable segment 208 may be bonded to the housing body 202 as described above. For example, the cable segment 208 may be bonded (e.g., sealed) to the housing body 202 with a union (e.g., weld bead or weld 212) formed by, e.g., TIG welding or other welding processes. The cable segment 208 may connect the sensor 200 with other sensors to form an array of sensors (see, e.g., sensor array 100 (FIG. 1)). As depicted, the weld 212 may be positioned to be placed at least partially within (e.g., entirely within) the end cap 204

As above, the sensor 200 may include one or more sensing elements connected to one or more electronic components. For example, the sensor 200 may include a quartz resonator sensor including one or more quartz crystals (e.g., sensing elements 114 (FIG. 2)). In some embodiments, the sensor 200 may include a reference quartz crystal resonator and a quartz crystal resonator sensing element configured to measure an ambient temperature environment within the wellbore 106 (FIG. 1) by at least partially exposing quartz crystal resonator sensing element to the ambient temperature environment (e.g., by thermal transmission through the housing body 202, through a working fluid, etc.). The reference quartz crystal resonator and the quartz crystal resonator sensing element may be operatively connected to an electronics assembly (e.g., electronic components 116 (FIG. 2)). An electrical interconnect may operatively connect conductors 214 of the cable segment 208 to the electronics assembly. The electronics assembly may include a high-frequency power source configured to drive the reference quartz crystal resonator. The electronics assembly may also drive the quartz crystal resonator sensing element with a high-frequency power source. Temperature-induced frequency changes in the quartz crystal resonator sensing element may be detected by monitoring variations in frequency of the quartz crystal resonator sensing element with respect to a frequency of the reference quartz crystal resonator. Data relating to frequency differences between the quartz crystal resonator sensing element and the reference quartz crystal resonator may be manipulated by the electronics assembly or by electrical equipment at the surface of the wellbore 106 (FIG. 1) to provide temperature data to an operator.

The central conductor 214 of the cable segment 208 is supported and/or secured by a retention element (e.g., spacer 222) disposed within the sleeve 210 of the housing body 202. In some embodiments, the spacer 222 may comprise an electrically insulating material (e.g., a polymer or elastomer material, such as, for example, polypropylene, polytetrafluoroethylene (PTFE), polyethylene terephthalate (PET), polyether ether ketone (PEEK), etc.) to electrically insulate the central conductor 214 from one or more portions of the housing body 202 or the cable segment 208. The spacer 222 may be secured (e.g., coupled, attached) to the at least a portion of the cable segment 208 (e.g., the central conductor 214). For example, one or more of the spacer 222 and the central conductor 214 may include one or more of protrusions and/or recess in order to secure the spacer 222 to the central conductor 214 in at least one direction (e.g., along the major length of the central conductor 214, for example, a length extending between successive sensors 200). As depicted, the spacer 222 and the central conductor 214 may include complementary threading 224 in order to secure the spacer 222 about the central conductor 214. In other embodiments, other attachment mechanisms may be implemented, such as, adhesives, other mechanical interference mechanisms (e.g., interlocking protrusions), fittings (e.g., compression fittings), combinations thereof, etc.

In some embodiments, the spacer 222 may be fixed to the central conductor 214 in a manner where the spacer 222 is positioned adjacent (e.g., abuts) an end 225 of the cable segment 208. For example, the spacer 222 may be fixed to the central conductor 214 and abutted with the end 225 of the cable segment 208 before the cable segment 208 is positioned partially within the housing body 202 and is welded to the housing body 202 at weld 212. In some embodiments, the housing body 202 may include a stop (e.g., shoulder 226 defining a necked portion) that the spacer 222 may abut with in order to impede movement of the spacer 222 further within the housing body 202. As depicted, the spacer 222 may be positioned between (e.g., sandwiched between) the housing body 202 and the cable segment 208 in order to secure the spacer 222 within the housing body 202 (e.g., preventing the spacer 222 from moving in a direction at least along the major length of the central conductor 214. In some embodiments, the spacer 222 may secure the central conductor 214 in other lateral directions.

As depicted, an end portion 228 of the central conductor 214 may extend through the spacer 222 and out of an opposing end of the spacer 222. In some embodiments, the sensor 200 may include a structure 230 that extends at least partially around the end portion 228 of the central conductor 214 (e.g., at least partially encapsulating the end portion 228 of the central conductor 214). For example, the structure 230 may comprise an insulative material (e.g., a polymer or elastomer) for isolating the end portion 228 of the central conductor 214 from other structures in the housing body 202. In other embodiments, the structure 230 may at least partially comprise a conductive material for electrically connecting the end portion 228 of the central conductor 214 to another portion of the sensor (e.g., the electronic components 116 (FIG. 2)). In some embodiments, the end portion 228 of the conductor 214 may be threaded.

Restricting the movement of the central conductor 214 with the spacer 222 may assist in reducing the likelihood that the central conductor 214 will contact (e.g., short with during or after being heated in a welding procedure) one or more other portions of the sensor 200, such as, for example, the cable segment 208 (e.g., an outer jacket 220 of the cable segment 208) or the structure 230.

In some embodiments, the spacer 222 may include a protrusion or post portion 231 that extends past the shoulder 226 and into the structure 230. The post portion 231 may act to provide a relatively larger interface area or surface to secure the spacer 222 with the conductor 214.

The cable segment 208 may include insulation 216 (e.g., electrical and/or thermal isolative material) and an encapsulation material 218. As described above, the insulation 216 and the encapsulation material 218 may be removed between the central conductor 214 and the outer jacket 220 (e.g., metal jacket) of the cable segment 208 near (e.g., proximate, at) the location of the weld 212, leaving a substantially annular void 236 between the central conductor 214 and the metal jacket 220. Removing the insulation 216 and encapsulation material 218 to leave the void 236 may prevent contamination of the weld bead, degradation of the insulation 216 and encapsulation material 218, and/or damage to the sensor components (e.g., sensing elements 114 and/or the electronic components 116 (FIG. 2), such as, the reference quartz crystal resonator, the quartz crystal sensing element) resulting from degradation of the insulation 216 and encapsulation material 218 during the welding process. Further, the void 236 and structures that are positioned in the void 236, as discussed below, about the conductor 214 may act to at least partially isolate the conductor 214 from the heat of the welding process. In some embodiments, the spacer 222 may protect the above-listed sensor components by impeding (e.g., slowing) heat transfer between the volume of void 236 and an interior of the housing body 202 within which the sensing elements 114 and/or the electronic components 116 (FIG. 2), such as, the reference quartz crystal resonator and the quartz crystal sensing element are disposed.

In some embodiments, one or more structures (e.g., electrically and/or thermally insulative structure) may optionally be disposed within the void 236 (e.g., after removal of the insulation 216 and the encapsulation material 218 and the before attaching the spacer 222). For example, an insulative sleeve 232 (e.g., comprising an electrically and/or thermally insulative material, such as, fiberglass, a polymer, an elastomer, etc.). The insulative sleeve 232 may be positioned between the conductor 214 and the outer jacket 220. For example, the insulative sleeve 232 may be positioned in and adjacent to (e.g., abutting) the outer jacket 220.

In some embodiments, may extend substantially the entire length of the void 236 (e.g., from the insulation 216 and/or the encapsulation material 218 to the spacer 222).

In some embodiments, the another structure (e.g., inner sleeve 234) may be positioned between the within the void 236 (e.g., between the conductor 214 and the outer jacket 220). For example, the inner sleeve 234 may be positioned within the insulative sleeve 232 between the conductor 214 and the insulative sleeve 234. The inner sleeve 234 may act to one or more of position, thermally isolate, and/or electrically isolate the conductor 214 within the void 236. In some embodiments, the inner sleeve 234 may extend only a portion of the length between the insulation 216 and/or the encapsulation material 218 and the spacer 222 and may leave one or more relatively smaller voids 236 present at either end of the inner sleeve 234. In some embodiments, the inner sleeve 234 may comprise a metal, a ceramic (e.g., alumina), a polymer or an elastomer, a composite material, combinations thereof, etc.

Figure 4:
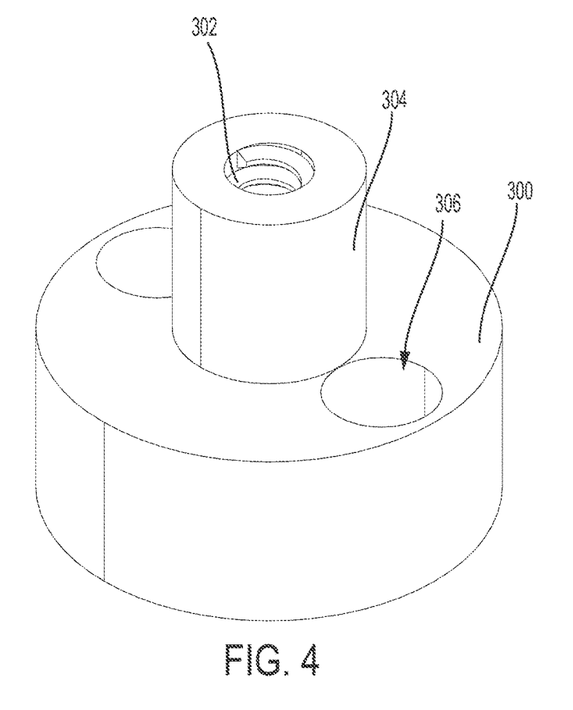
FIG. 4 is an isometric view of a retention element (e.g., a spacer) for use with a sensor in accordance with an embodiment of the present disclosure.

FIG. 4 is an isometric view of a spacer 300 for use with a sensor (e.g., sensors 102, 200 as shown in FIGS. 1 through 3). As shown in FIG. 4 the spacer 300 includes a coupling feature (e.g., threads 302) for interfacing with the conductors 214 (FIG. 3). In some embodiments, the spacer 300 may include a protrusion or post portion 304 that has the threads 302 defined at least partially within the post portion 304. In some embodiments, the spacer 300 may include one or more apertures 306 extending through the spacer 300 (e.g., axially through the spacer 300), which may enable gasses (e.g., caused by a welding process) to pass through the spacer 300 to another portion of the housing body 202 of the sensor 200 (FIG. 3).

In some embodiments, the spacer 300 may include one or more flats on an exterior portion of the spacer 300. Such flats may enhance the ability for a tool (e.g., a wrench) to grip the spacer 300 during installation of the spacer 300 on the conductor 214 (FIG. 3).

Referring now to both FIGS. 2 and 3, a sensor 200 may be assembled with one or more cable segments 208 in the following manner. Sensor components (e.g., sensing elements 114) and electronic components (e.g., electronic components 116), such as, the reference quartz crystal resonator, the quartz crystal sensing element, and the electronics assembly, may be provided and/or assembled.

As discussed above, the insulation 216 and encapsulation material 218 may be removed from ends of the cable segment 208. In some embodiments, the insulation 216 and encapsulation layer 218 may be removed by machining, for example, with a hollow end mill (not shown) having a central opening configured to fit over the conductor 214 and an outer diameter sized to fit within the inside of the metal jacket 220. The cable segment 208 may be mounted in a tooling device (e.g., a jig or vise) of a milling machine and the hollow end mill may be used to remove a portion of the insulation 216 and the encapsulation material 218 from between the conductor 214 and the metal jacket 220 to create the substantially annular void 236. In some embodiments, the insulation 216 and encapsulation material 218 may alternatively or additionally be removed by exposing the insulation 216 and encapsulation material 218 to a solvent. As non-limiting examples, the insulation 216 and encapsulation material 218 may be removed from within about 1 inch (25.4 mm) of an end 168 of the metal jacket 220 or from within about 2 inches (50.8 mm) of the end 168 of the metal jacket 220. In other embodiments, the insulation 216 and encapsulation layer 218 may be removed from within less than one inch or more than two inches from the end 168 of the metal jacket 220.

The spacer 222 may be coupled to (e.g., threaded on) the conductor 214. The cable segment 208 may be inserted within the sleeve 210 of the housing body 202. The spacer 222 may be disposed within the sleeve 210 of the housing body 202 and serve to secure and, optionally, centralize the conductor 214 within the housing end cap 204 and electrically insulate the conductor 214 from the housing body 202. In some embodiments, the spacer 222 may be positioned to abut the end 225 of the metal jacket 220 of the cable segment 208. In some embodiments, the spacer 222 may be positioned to abut the shoulder 226 of the housing body 202.

The metal jacket 220 of the cable segment 208 may be welded to the sleeve 210 of the housing body 202 using any of the welding methods described above. Before or after welding the metal jacket 220 of the cable segment 208 to the sleeve 210 of the housing body 202, the conductor 214 may be connected to the electronic components 116. The end cap 204 may be placed over at least a portion of one or more of the housing 202 or the cable segment 206 (e.g, surrounding the weld 212) and may be secured to the housing by weld 206.

In a similar manner, an opposing cable segment 208 and an opposing housing end cap 204 may mate with the housing body 202 at joints or welds 206, 212 as discussed above.

Embodiments of the present disclosure provide a sensor array for downhole use utilizing electrical interconnecting cables between individual sensors of the sensor array. As discussed above, conventional downhole sensor systems feature fiber optic data interconnects between sensor devices. Fiber optical interconnects may have significant disadvantages as compared to the electrical interconnects disclosed herein. For example, optical fibers are sensitive to geometry and alignment and may fail to accurately transmit data if the optical fiber is bent (e.g., kinked) to a radius of curvature smaller than a certain value. Furthermore, optical fibers may be fragile and prone to failure under conditions of shock and vibration frequently encountered in a downhole environment. In contrast, the use of electrical conductors as disclosed herein may provide a robust and reliable connection between sensors of the sensor array as a more robust and/or less expensive and fragile alternative to the use of fiber optics. Moreover, welding the metal jacket of the cable segments to the housing body and the housing end cap may provide a bond and seal between the cable segments and the sensor capable of withstanding the elevated temperatures and extreme pressures to which the sensor array may be subjected during use. Finally, the configuration of the housing body and the housing end cap may enable the welding processes described herein to be performed without damaging sensitive components (e.g., the one or more sensing elements and the one or more electrical components) within the housing and the cable housing connecting the housings.

Further, the sensors including one or more securing features or elements (e.g., spacers) may act to at least partially reduce or prevent the likelihood of the conductor contacting and/or shorting against another portion of the sensor. For example, the conductor may move and/or expand during a fabrication process, such as a welding process, and come in contact with another portion of the sensor (e.g., by buckling and contacting a portion of the outer sleeve of the cable segment). Restricting the movement of the central conductor with the spacer may assist in reducing the likelihood that the central conductor will contact (e.g., shorting with during or after being heated in a welding procedure) one or more other portions of the sensor, such as, for example, the cable segment (e.g., an outer jacket of the cable segment) or the structure.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure encompasses all modifications, variations, combinations, and alternatives falling within the scope of the disclosure as defined by the following appended claims and their legal equivalents.

What is claimed is:

1. A downhole distributed sensor array, comprising:
a plurality of sensor housings, each sensor housing containing at least one of a pressure sensor or a temperature sensor;
a plurality of cable segments connecting the sensor housings, at least one of the cable segments comprising a conductor extending through the at least one cable segment; and
a spacer positioned adjacent and coupled and secured to at least a portion of the conductor at a location proximate an interface between the at least one cable segment and a respective sensor housing of the sensor housings coupled to the at least one cable segment, the spacer configured to at least partially secure the conductor and at least partially prevent movement in a direction along a length of the conductor, the conductor being in direct contact with and extending through and beyond the spacer to connect with the at least one of a pressure sensor or a temperature sensor, wherein an interface between the spacer and the at least a portion of the conductor comprises a threaded interface for securing the conductor to the spacer.

2. The distributed sensor array of claim 1, wherein the at least one of a pressure sensor or a temperature sensor comprises a quartz resonator sensor.

3. The distributed sensor array of claim 1, wherein the spacer is positioned about an exposed portion of the conductor of the at least one cable segment.

4. The distributed sensor array of claim 3, wherein the at least one cable segment comprises an insulation material disposed between a portion of the conductor and a portion of a jacket of the at least one cable segment, the insulation material extending along a majority of a length of the at least one cable segment between adjacent sensor housings.

5. The distributed sensor array of claim 4, wherein the conductor substantially lacks the insulation material proximate the spacer.

6. The distributed sensor array of claim 5, further comprising another insulation material separate from the insulation material positioned between the conductor and the at least one cable segment.

7. The distributed sensor array of claim 6, wherein the another insulation material comprises at least one of a first sleeve comprising a polymer material or a second sleeve comprising a metal or metal alloy material.

8. The distributed sensor array of claim 1, wherein the spacer comprises at least one opening extending axially through the spacer.

9. The distributed sensor array of claim 1, wherein the spacer is positioned between an end of the at least one of cable segment and a portion of the sensor housing in order to secure the conductor.

10. The distributed sensor array of claim 1, wherein the spacer is positioned adjacent to an end portion of the at least one cable segment.

11. The distributed sensor array of claim 10, wherein the spacer abuts the end portion of the at least one cable segment.

12. A downhole distributed sensor array, comprising:
a plurality of sensor housings containing at least one of a pressure sensor or a temperature sensor;
a plurality of cable segments, each cable segment connected to at least one sensor housing and comprising an insulation material disposed between a central conductor and an outer jacket;
a weld joint peripherally bonding a longitudinal end portion of the at least one sensor housing to the outer jacket of a cable segment of the cable segments; and
a retention element positioned outside and proximate to the cable segment, a portion of the central conductor of the cable segment being secured to the retention element to at least substantially inhibit the central conductor from moving in a direction along the length of the array.

13. The distributed sensor array of claim 12, wherein the retention element is configured to secure the central conductor to substantially prevent the central conductor from moving in a direction along a length of the cable segment extending between adjacent sensor housings.

14. The distributed sensor array of claim 12, wherein the retention element is substantially prevented from moving in a direction along a length of the cable segment between adjacent sensor housings by at least a portion of the sensor housing.

15. A downhole sensor comprising:
a sensor housing containing at least one of a pressure sensor or a temperature sensor;
at least one cable segment coupled to the sensor housing, the at least one cable segment having a conductor extending through the at least one cable segment; and
a retention element positioned about and coupled to at least a portion of the conductor at a location proximate an interface between the at least one cable segment and the sensor housing, the retention element configured to secure the conductor in a direction along a length of the conductor to at least substantially prevent the conductor from moving in a direction along the length of the conductor.

16. The downhole sensor of claim 15, wherein the sensor housing comprises a plurality of sensor housings, each having at least one cable segment coupled to the sensor housing and at least one retention element coupled to a conductor of the at least one cable segment.

17. A method of forming a sensor for downhole use, the method comprising:

removing a portion of an insulation material from between a conductor of a cable segment and a jacket of the cable segment proximate an end portion of the cable segment to create an annular opening between the conductor and a surrounding portion of the jacket;

disposing at least one insulative material within the annular opening, the at least one insulative material being distinct from the portion of the insulation material;

securing a spacer to the conductor proximate the end portion of the cable segment by threading the spacer to the conductor; and inserting the end portion of the cable segment with the spacer secured to the conductor into a sensor housing.

18. The method of claim 17, further comprising abutting the spacer with the end portion of the cable segment.

19. The method of claim 17, further comprising securing another conductor of another cable segment to the sensor housing with another spacer.

20. The method of claim 17, further comprising at least substantially preventing the conductor from moving in a direction along a length of the cable segment with the spacer.

\* \* \* \* \*